(12) United States Patent
Hosono

(10) Patent No.: US 11,809,251 B2
(45) Date of Patent: Nov. 7, 2023

(54) POWER CONTROL DEVICE, DISPLAY DEVICE, AND POWER CONTROL METHOD

(71) Applicant: Sharp NEC Display Solutions, Ltd., Tokyo (JP)

(72) Inventor: Hideaki Hosono, Tokyo (JP)

(73) Assignee: Sharp NEC Display Solutions, Ltd., Tokyo (JP)

( * ) Notice: Subject to any disclaimer, the term of this patent is extended or adjusted under 35 U.S.C. 154(b) by 0 days.

(21) Appl. No.: 17/840,043

(22) Filed: Jun. 14, 2022

(65) Prior Publication Data

US 2022/0308649 A1     Sep. 29, 2022

Related U.S. Application Data

(63) Continuation of application No. PCT/JP2019/050825, filed on Dec. 25, 2019.

(51) Int. Cl.
G06F 1/28 (2006.01)
G06F 1/30 (2006.01)
G06F 1/26 (2006.01)

(52) U.S. Cl.
CPC .............. G06F 1/28 (2013.01); G06F 1/266 (2013.01); G06F 1/30 (2013.01)

(58) Field of Classification Search
CPC .............. G06F 1/266; G06F 1/28; G06F 1/30
See application file for complete search history.

(56) References Cited

U.S. PATENT DOCUMENTS

2007/0223164 A1    9/2007  Oki et al.
2015/0380924 A1*  12/2015  Ohwaki .............. H02H 3/0935
                                                361/93.7

FOREIGN PATENT DOCUMENTS

JP   2004-094821 A    3/2004
JP   2005-050194 A    2/2005
JP   2005-323413 A   11/2005

OTHER PUBLICATIONS

International Search Report (ISR) (PCT Form PCT/ISA/210), in PCT/JP2019/050825, dated Feb. 10, 2020.

* cited by examiner

*Primary Examiner* — Mark A Connolly
(74) *Attorney, Agent, or Firm* — McGinn I.P. Law Group, PLLC

(57) ABSTRACT

A first overcurrent detecting unit to detect whether or not a current supplied from a power source unit to an external device exceeds a first criterion value. A second overcurrent detecting unit to detect whether or not the current supplied from the power source unit to the external device exceeds a second criterion value that is a criterion value higher than the first criterion value, a timer unit in which a time corresponding to a time from a time point at which switching from electric power supplied from the power source unit to the external device in a period, in which a negotiation is performed, to electric power corresponding to a result of the negotiation with the external device is performed to a time before the supply of the electric power becomes stable is set. A control unit is to perform overcurrent detection using the second overcurrent detecting unit before the negotiation ends and, when the negotiation ends, and the time set in the timer unit elapses, invalidate the overcurrent detection using the second overcurrent detecting unit and validate the overcurrent detection using the first overcurrent detecting unit are included.

9 Claims, 5 Drawing Sheets

FIG. 2

| VBUS SUPPLY (MAX VALUE) ||
|---|---|
| OUTPUT VOLTAGE | OUTPUT CURRENT |
| 5V | 3A |
| 9V | 3A |
| 12V | 3A |
| 15V | 3A |
| 20V | 5A |

POWER CONTROL DEVICE, DISPLAY DEVICE, AND POWER CONTROL METHOD

TECHNICAL FIELD

The present invention relates to a power control device, a display device, and a power control method.

BACKGROUND ART

In recent years, by connecting a display device (a source device) and an external device (a sink device) using a cable, supply of a power source from the display device to the external device has been performed. For a connection between a display device and an external device, a cable compliant with a standard of Universal Serial Bus (USB) Type-C may be used.

In this Universal Serial Bus (USB) Type-C, the function of supplying electric power is called USB power delivery (USB power delivery/hereinafter, referred to as USB-Type-C PD). By using this USB-Type C cable, electric power up to a maximum of 100 W can be supplied and received.

When a display device is connected to an external device through a USB-Type C cable, the display device supplies electric power of a predetermined voltage to the external device. The external device receives the supply of electric power of the predetermined voltage that has been supplied and is driven using this electric power, thereby performing a negotiation process with the display device. When the negotiation ends, the display device supplies electric power to the external device with the voltage raised up to a voltage corresponding to a result of the negotiation.

At that time, when the voltage is raised up to the voltage corresponding to the result of the negotiation, there are cases in which an inrush current flows from the display device to the external device in accordance with a variation in the voltage.

As a technology for preventing an inrush current, there is a technology disclosed in Patent Literature 1. In Patent Literature 1, a timer counting a time until a current becomes stable after supply of a power source to an external device is used, and while this timer operates, a normal device is assumed to be connected, and even if an overcurrent is detected, the supply of the power source does not stop.

CITATION LIST

Patent Literature

[Patent Literature 1]
Japanese Unexamined Patent Application, First Publication No. 2004-094821

SUMMARY OF INVENTION

Technical Problem

However, in a case in which a negotiation is performed, and an inrush current flows until the current becomes stable after start of supply of a power source to an external device, when a current value of the inrush current exceeds an upper limit value of the current set at a normal time, the supply of the electric power may stop due to generation of an overcurrent. In other words, electric power corresponding to a result of a negotiation process is supplied, and in accordance with an inrush current exceeding an upper limit value of the current set using a state in which a voltage or a current is stable as a reference, the supply of the electric power may stop.

In such a case, when the supply of the power source stops, a user may misunderstand that it is due to a malfunction of a USB-TypeC PD function of a display device. Here, in a case in which the supply of a power source is configured not to stop even when an overcurrent is detected before the current becomes stable after the supply of the power source to an external device, an overcurrent cannot be prevented from flowing at a normal time.

A problem to be solved is that the supply of electric power stops in a state in which a malfunction has not necessarily occurred.

Solution to Problem

One embodiment of the present invention includes: a first overcurrent detecting unit configured to detect whether or not a current supplied from a power source unit to an external device exceeds a first criterion value; a second overcurrent detecting unit configured to detect whether or not the current supplied from the power source unit to the external device exceeds a second criterion value that is a criterion value higher than the first criterion value; a timer unit in which a time corresponding to a time from a time point at which switching from electric power supplied from the power source unit to the external device in a period, in which a negotiation is performed, to electric power corresponding to a result of the negotiation with the external device is performed to a time before the supply of the electric power becomes stable is set; and a control unit configured to perform overcurrent detection using the second overcurrent detecting unit before the negotiation ends and, when the negotiation ends, and the time set in the timer unit elapses, invalidate the overcurrent detection using the second overcurrent detecting unit and validate the overcurrent detection using the first overcurrent detecting unit.

In addition, according to one aspect of the present invention, there is provided a power control method including: detecting whether or not a current supplied from a power source unit to an external device exceeds a first criterion value; detecting whether or not the current supplied from the power source unit to the external device exceeds a second criterion value that is a criterion value higher than the first criterion value; counting whether a setting time in which a time corresponding to a time from a time point at which switching from electric power supplied from the power source unit to the external device in a period, in which a negotiation is performed, to electric power corresponding to a result of the negotiation with the external device is performed to a time before the supply of the electric power becomes stable is set has elapsed; and performing overcurrent detection based on the second criterion value before the negotiation ends and, when the negotiation ends, and the setting time elapses, invalidating the overcurrent detection based on the second criterion value and validating the overcurrent detection based on the first criterion value.

Advantageous Effects of Invention

According to the present invention, supply of electric power can be prevented from stopping in a state in which a malfunction has not necessarily occurred.

BRIEF DESCRIPTION OF DRAWINGS

FIG. 2 is a diagram illustrating a relation between an output voltage and an output current that can be output by a power converting unit 20.

DESCRIPTION OF EMBODIMENTS

Figure 1:
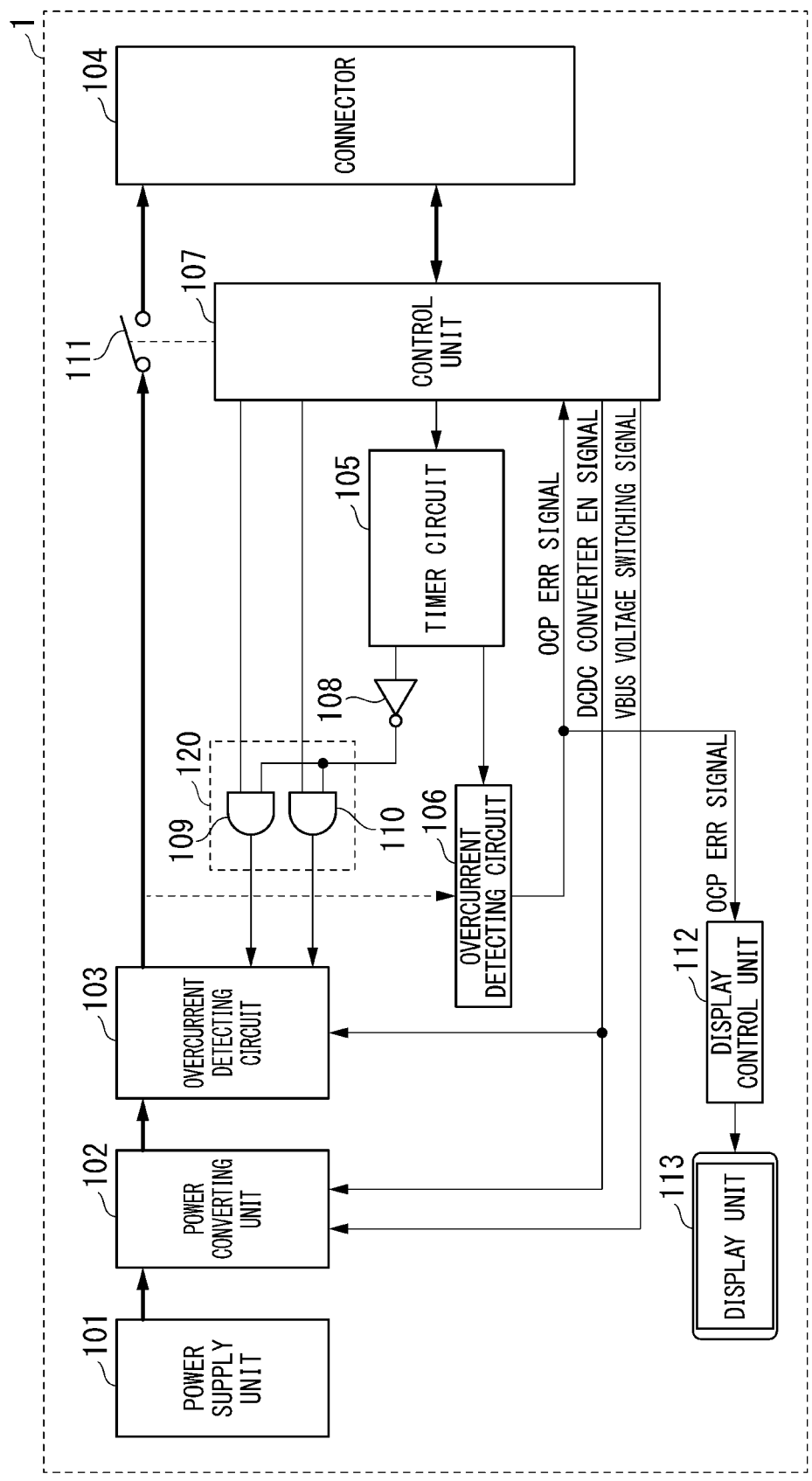
FIG. 1 is a functional block diagram illustrating the configuration of a power control device 1 according to one aspect of the present invention.

FIG. 1 is a functional block diagram illustrating the configuration of a power control device 1 according to one aspect of the present invention.

The power control device 1, for example, can be mounted in an electronic device such as a display device or connected to the outside.

The power control device 1 includes: a power supply unit 101, a power converting unit 102, an overcurrent detecting circuit 103, a connector 104, a timer circuit 105, an overcurrent detecting circuit 106, a control unit 107, an inverter circuit 108, a first end circuit 109, a second end circuit 110, a switching unit 111, a display control unit 112, and a display unit 113. The power control device 1 has a function compatible with USB-Type-C PD.

The power supply unit 101 is electrically connected to the power converting unit 102. The power supply unit 101 supplies electric power to the power converting unit 102. Although the power supply unit 101 may supply electric power of either DC or AC to the power converting unit 102, in this embodiment, a case in which DC electric power is supplied will be described.

The power converting unit 102 is electrically connected to the power supply unit 101, the overcurrent detecting circuit 103, and the control unit 107. The power converting unit 102 receives electric power supplied from the power supply unit 101, converts the electric power into an output voltage that is a target voltage to be supplied, and outputs the output voltage to the overcurrent detecting circuit 103.

The power converting unit 102, for example, is a DC-DC converter circuit. The power converting unit 102 outputs an input DC voltage as a DC voltage of the same voltage. In addition, the power converting unit 102 can output a voltage higher than an input voltage by boosting the input DC voltage.

A maximum current value that is a current that can be supplied by the power converting unit 102 is set as a current value according to an inrush current. There is a possibility of an inrush current being generated when electric power for performing a negotiation process starts to be supplied to an external device in accordance with the external device being connected to the connector 104 and when switching from a voltage supplied to an external device to a voltage corresponding to a result of a negotiation process is performed during the negotiation process by performing a negotiation between the control unit 107 and the external device. Factors in generation of such an inrush current include capacitance of an input capacitor of an external device, impedance of the external device, and the like. It is preferable to set a maximum current value of the power converting unit 102 with a current value of this inrush current at a peak time taken into account. Here, when a peak current value of an inrush current generated when supply of electric power for performing a negotiation process to an external device starts is compared with a peak current value of an inrush current generated when switching to a voltage corresponding to a result of the negotiation process is performed, the peak current value of the inrush current generated when switching to the voltage corresponding to the result of the negotiation process is larger than that of the inrush current generated when the supply starts. For this reason, the maximum current value of the power converting unit 102 can be determined with the peak current value of the inrush current generated when switching to the voltage corresponding to the result of the negotiation process taken into account. In accordance with this, when switching to a voltage corresponding to a result of a negotiation process is performed, even in a case in which an inrush current larger than an inrush current generated at the time of starting the negotiation process is generated, the power converting unit 102 can determine whether or not supply of the electric power is to be shut off in accordance with whether or not an overcurrent due to the connected external device flows. For this reason, in a case in which an overcurrent due to a connected external device does not flow, the electric power can be continuously supplied to the external device without shutting off the supply of the electric power.

In addition, regarding a maximum current value of the power converting unit 102, for example, in a case in which a connected external device is a battery or a motor, the current value of the inrush current is frequently larger than that in a case in which an external device does not include a motor and the like. For this reason, the power converting unit 102 of a rated value assuming a maximum current value larger than that of an external device not including a motor and the like may be used. For example, in a case in which a maximum current value assuming connection of an external device not including a motor and the like is 7 A, the power converting unit 102 compatible with a maximum current value of 10 A may be used.

FIG. 2 is a diagram illustrating a relation between an output voltage and an output current that can be output by a power converting unit 20 and is a diagram illustrating a relation between the output voltage and the output current in a case in which supplied electric power is electric power of 60 W to 100 W.

In the USB-Type-C PD, in a case in which an output voltage is different, a maximum output current may be different. In other words, the USB-Type-C PD performs a negotiation with an external device, sets arbitrary electric power corresponding to a request of the external device within a range of the electric power that can be supplied by its own power control device, and supplies the set electric power to the external device. A current supplied at this time changes in accordance with the set electric power. For example, in a case in which supply electric power determined through a negotiation is 60 W, and an output voltage is set to a voltage between 5 V and 20 V, a supply current value can be fixed to 3 A.

Here, in the standard of the USB-Type-C PD, supply electric power can be set up to 100 W. For this reason, in a case in which, as a result of a negotiation, for example, electric power between electric power of over 60 W to electric power of 100 W is determined as supply electric power, as illustrated in FIG. 2, the output current is set to 3 A for an output voltage of 5 V to 15 V, and the output current is 5 A in a case in which the output voltage is set to 20 V. For this reason, the peak current value of an inrush current generated when switching to a voltage corresponding to a result of a negotiation process is larger in a case in which the output voltage at the time of the negotiation transitions to the output voltage of 20 V than in a case in which the output voltage transitions to an output voltage between 5 V and 15 V. In this embodiment, there are considered to be cases in which switching of the output current is performed when the output voltage is switched to an output voltage corresponding to the result of the negotiation process, and it is assumed that, as the output current increases, the inrush current also increases as much, and the maximum current value of the power converting unit 102 is set.

The overcurrent detecting circuit 103 is electrically connected to the power converting unit 102, the control unit 107, the switching unit 111, the first end circuit 109, and the second end circuit 110. The overcurrent detecting circuit 103 detects whether or not a current supplied to an external device connected to the connector 104 from the power converting unit 102 exceeds a first criterion value. The first criterion value is a value used as a criterion for determining whether or not there is an abnormality in a current value supplied when a VBUS voltage stabilization time (hereinafter, simply referred to as a voltage stabilization time) has elapsed after switching to electric power corresponding to a result of the negotiation process.

The voltage stabilization time is a time determined on the basis of a time from a time point at which switching from a voltage during a negotiation process to a voltage corresponding to a result of the negotiation process is performed to a time when variations in the output electric power supplied from the power converting unit 102 to an external device become stable. As this voltage stabilization time, a standard value set in USB PD 3.0 may be used.

In addition, the overcurrent detecting circuit 103 is driven in accordance with a signal from the first end circuit 109 or the second end circuit 110 during a period in which a DCDC converter EN signal is output (the DCDC converter EN signal is on) from the control unit 107 and stops an overcurrent detection function in a case in which the DCDC converter EN signal is not output (the DCDC converter EN signal is oft).

In other words, at a normal time at which electric power is supplied to an external device, the overcurrent detecting circuit 103 performs detection of an overcurrent.

The connector 104 is connected to an external device that is a device disposed outside the power control device 1. The shape of a terminal of this connector 104 is a shape compliant with a USB-Type C standard. The connector 104 can be connected to an external device through a cable compliant with the USB-Type C standard.

A time corresponding to a time until supply of electric power switched to electric power corresponding to a result of a negotiation becomes stable from start of the negotiation is set in the timer circuit 105. The time set in the timer circuit 105 may have a time point at which a negotiation has started as its base, or it may have a time point at which connection of an external device of the opposite side to the connector 104 through the USB-Type C cable has been detected as its base.

In addition, as the setting time that is set in the timer circuit 105, a time acquired by adding a voltage stabilization time to a time required for a negotiation process with start of a negotiation process or a time point at which connection of an external device of the opposite side through the USB-Type C cable is detected as its base can be used. Furthermore, this setting time may include a time required for a negotiation process, a voltage stabilization time, and a time of a margin. A timer value set in the timer circuit 105 may be a value corresponding to this setting time.

Here, although the voltage stabilization time can be arbitrarily set, for example, the connector 104 is a connector compliant with the USB Type-C standard, and as the voltage stabilization time, a voltage stabilization time (a maximum of 270 ms) that is a standard value based on the USB PD 3.0 may be set with a time point at which the connector is connected to an external device on the basis of the USB Type-C standard as its base.

In addition, in a period in which counting is performed using a timer function, the timer circuit 105 outputs an on signal to the overcurrent detecting circuit 106 and the inverter circuit 108. As the on signal, for example, a signal representing "HI" out of "HI" and "LOW" may be used.

In this way, the timer circuit 105 outputs an on signal to the overcurrent detecting circuit 106 in a period including a time required for a negotiation process and a voltage stabilization time, and can thereby validate an overcurrent detection function of the overcurrent detecting circuit 106 during a period in which this on signal is output. In accordance with this, the overcurrent detection function of the overcurrent detecting circuit 106 is valid in a period including a time required for a negotiation process and a voltage stabilization time, and the overcurrent detection function of the overcurrent detecting circuit 106 can be invalidated after this period elapses.

An inrush current is mainly generated in a period in which an output voltage is not stable. An inrush current generated in the voltage stabilization time can be detected using a method (details will be described below, and the inrush current is detected using a different second criterion value) different from that used for a stable time by using the timer circuit 105 and the overcurrent detecting circuit 106. In accordance with this, in a voltage stabilization time, for an inrush current generated in accordance with switching of the output voltage, generation/no-generation of an overcurrent can be determined using a criterion value higher than the criterion value at the normal time. Thus, even when an inrush current is generated in accordance with switching of the output voltage, in a case in which an inrush current is generated due to characteristics of a source device, the supply of the power source can be shut off.

The overcurrent detecting circuit 106 is electrically connected to the overcurrent detecting circuit 103, the timer circuit 105, and the control unit 107.

The overcurrent detecting circuit 106 detects whether or not a current supplied from the power converting unit 102 to an external device exceeds a second criterion value that is a criterion value higher than the criterion value set in the overcurrent detecting circuit 103.

As the second criterion value, a value corresponding to a maximum value of the inrush current flowing at the time of switching to electric power corresponding to a result of a negotiation can be used. For example, as the result of the negotiation, in a case in which electric power that is over 60 W and is up to 100 W is supplied, the output current is 5 A in a case in which the output voltage is 20 V as the second criterion value. For this reason, on the basis of this output current, as a current value assuming a case in which an inrush current is generated, 10 A may be set.

When an on signal is output from the timer circuit 105, the overcurrent detecting circuit 106 performs detection of an overcurrent. In a case in which detection of an overcurrent is performed, the overcurrent detecting circuit 106 determines whether or not the second criterion value that is a current value higher than the first criterion value that is the criterion value detected by the overcurrent detecting circuit 103 is supplied from the power converting unit 102 to the connector 104 and, in a case in which it is determined that a current value exceeds the second criterion value, outputs an error signal (for example, an open core protocol (OCP) ERR signal) indicating that the current value exceeds the second criterion value to the control unit 107 and the display control unit 112.

In addition, when the supply of the on signal output from the timer circuit 105 stops, the overcurrent detecting circuit 106 stops the detection of an overcurrent.

The control unit 107 is electrically connected to the power converting unit 102, the overcurrent detecting circuit 103, the timer circuit 105, the overcurrent detecting circuit 106, the switching unit 111, the connector 104, the first end circuit 109, the second end circuit 110, and the display control unit 112.

When an external device is connected to the connector 104, the control unit 107 detects that the external device is connected to the connector 104, performs a negotiation with the external device, determines voltage and current values that are applicable between the power control device 1 and the external device, and starts supply of electric power to the external device.

Here, the negotiation is a process of performing transmission/reception of information about an applicable electric power (a voltage and a current), which is performed between a source device (the power control device 1) and a sink device (an external device) using a USB protocol, in USB power delivery (power delivery using a USB Type-C connector) and determining electric power (a voltage and a current) which is to be supplied or of which supply is received.

When connection of an external device to the connector 104 is detected, the control unit 107 outputs an instruction for causing the timer circuit 105 to start counting.

When an instruction for starting counting is output to the timer circuit 105, the control unit 107 turns on (validates; activates) an enable signal (hereinafter, referred to as a DCDC converter EN signal) output to the power converting unit 102 and the overcurrent detecting circuit 103.

When an error signal indicating that an overcurrent has been detected from the overcurrent detecting circuit 106 is received, the control unit 107 turns off (invalidates; inactivates) the DCDC converter EN signal (enable signal), outputs an instruction for stopping counting of the timer circuit 105, and outputs a shutoff signal that is an instruction for shutting off the circuit to the switching unit 111.

The control unit 107 outputs a switching signal (hereinafter, referred to as a VBUS voltage switching signal) indicating switching to a voltage determined through a negotiation with an external device. Here, the control unit 107 outputs a VBUS voltage switching signal representing 5 V while the negotiation process is performed and outputs a VBS voltage switching signal designating one voltage among 5 V, 9 V, 12 V, 15 V, and 20 V that is a voltage corresponding to a result of the negotiation when the negotiation ends.

The control unit 107 outputs a voltage setting signal representing the output voltage (VBUS voltage) to one of the first end circuit 109 and the second end circuit 110. For example, the control unit 107 outputs a first voltage setting signal to the first end circuit 109 in a case in which the output voltage is one of 5 V, 9 V, 12 V, and 15 V and outputs a second voltage setting signal to the second end circuit 110 in a case in which the VBUS voltage is 20 V.

In a case in which electric power that is equal to or higher than 60 W and is up to 100 W is supplied as a result of the negotiation process, the first voltage setting signal is output in a case in which the output voltage is 5 V, 9 V, 12 V, or 15 V, and all the output currents in the case of such output voltages are 3 A. In addition, the second voltage setting signal is output in a case in which the output voltage is 20 V, and an output current in the case of this output voltage is 5 A. In this embodiment, although a case in which the control unit 107 outputs one of the first voltage setting signal and the second voltage setting signal is described, in a case in which types of output currents are three or more types, there may be the number of voltage setting signals according to the number of the types. In accordance with this, also in a case in which electric power is supplied to an external device in accordance with a standard other than the USB Type-C PD standard, criterion values of overcurrent can be set in the overcurrent detecting circuit 103 in accordance with a value of the output current.

In a case in which the overcurrent detecting circuit 103 detects that the current value exceeds the first criterion value, or in a case in which the overcurrent detecting circuit 106 detects that the current value exceeds the second criterion value, the control unit 107 turns off the switching unit 111 and stops the supply of electric power to the external device from the power converting unit 102.

Before the negotiation ends (for example, when the negotiation starts and during the negotiation process), the control unit 107 performs detection of an overcurrent using the overcurrent detecting circuit 106. Then, when the negotiation ends, and the time set in the timer circuit 105 elapses, the control unit 107 invalidates detection of an overcurrent using the overcurrent detecting circuit 106 and validates detection of an overcurrent using the overcurrent detecting circuit 103.

While the negotiation is performed and before the time set in the timer circuit 105 elapses, the control unit 107 invalidates the overcurrent detecting circuit 103.

The inverter circuit 108 is electrically connected to the timer circuit 105, the first end circuit 109, and the second end circuit 110.

The inverter circuit 108 inverts a signal input from the timer circuit 105 and outputs the signal after inversion to the first end circuit 109 and the second end circuit 110.

More specifically, when an on signal (for example, "HI") is output from the timer circuit 105, the inverter circuit 108 inverts the on signal to an off signal (for example "LOW") and outputs the off signal to the first end circuit 109 and the second end circuit 110. When an off signal (for example, "LOW") is output from the timer circuit 105, the inverter circuit 180 inverts the off signal to the on signal (for example "HI") and outputs the on signal to the first end circuit 109 and the second end circuit 110.

As the inverter circuit 108, for example, a NOT gate circuit can be used.

The first end circuit 109 is connected to the control unit 107, the inverter circuit 108, and the overcurrent detecting circuit 103. One input of the first end circuit 109 is connected to a terminal that can output the first voltage setting signal of the control unit 107, and the other input is connected to the inverter circuit 108.

In a case in which at least one signal out of a signal input from the inverter circuit 108 and a signal input from the control unit 107 is "LOW", the first end circuit 109 outputs "LOW" to the overcurrent detecting circuit 106. For example, the first end circuit 109 outputs the "LOW" signal to the overcurrent detecting circuit 103 in a case in which a signal input from the inverter circuit 108 is an on signal, and a state in which the first voltage setting signal is not input from the control unit 107 (a "LOW" state) is formed and outputs the "HI" signal to the overcurrent detecting circuit 103 in a case in which the signal input from the inverter circuit 108 is an on signal, a state in which the first voltage setting signal is input from the control unit 107 (a "HI" state) is formed.

In other words, the first end circuit 109 outputs "HI" to the overcurrent detecting circuit 103 in a case in which the first voltage setting signal is input in a period in which the timer circuit 105 does not perform counting using the timer function and outputs "LOW" in other cases.

The second end circuit 110 is connected to the control unit 107, the inverter circuit 108, and the overcurrent detecting circuit 103. One input of the second end circuit 110 is connected to a terminal that can output the second voltage setting signal of the control unit 107, and the other input is connected to the inverter circuit 108.

In a case in which at least one signal out of a signal input from the inverter circuit 108 and a signal input from the control unit 107 is "LOW", the second end circuit 110 outputs "LOW" to the overcurrent detecting circuit 106. For example, the second end circuit 110 outputs the "LOW" signal to the overcurrent detecting circuit 103 in a case in which a signal input from the inverter circuit 108 is an on signal, and a state in which the second voltage setting signal is not input from the control unit 107 (a "LOW" state) is formed and outputs the "HI" signal to the overcurrent detecting circuit 103 in a case in which the signal input from the inverter circuit 108 is an on signal, and the second voltage setting signal is input from the control unit 107 (a "HI" state).

In other words, the second end circuit 110 outputs "HI" to the overcurrent detecting circuit 103 in a case in which the second voltage setting signal is input in a period in which the timer circuit 105 does not perform counting using the timer function and outputs "LOW" in other cases.

Here, in this embodiment, although two end circuits including the first end circuit 109 and the second end circuit 110 are used for supplying the first voltage setting signal, the second voltage setting signal, and a signal corresponding to the counting state of the timer function to the overcurrent detecting circuit 103, in a case in which an end circuit is disposed for each value of the output current corresponding to a VBUS voltage, the number of end circuits may be three or more. Here, in a case in which the VBUS voltage is one of 5 V, 9 V, 12 V, and 15 V, the output current is 3 A, and in a case in which the VBUS voltage is 20 V, the output current is 5 A, and thus there are two types of output currents. Thus, as ends circuits, two end circuits including the first end circuit 109 used for 3 A and the second end circuit 110 used for 5 A are disposed. In addition, in a case in which there are three or more types of output currents, end circuits may be disposed in accordance with the types (the number of types of voltage setting signals). In accordance with this, also in a case in which electric power is supplied to an external device in accordance with a standard other than the USB-Type C PD standard, criterion values of the overcurrent can be set in the overcurrent detecting circuit 103 in accordance with a value of the output current.

In addition, here, although a case in which two end circuits including the first end circuit 109 and the second end circuit 110 are used for supplying the first voltage setting signal, the second voltage setting signal, and a signal corresponding to the counting state of the timer function to the overcurrent detecting circuit 103 is described, another configuration may be used without using the first end circuit 109 and the second end circuit 110. For example, a selection signal supplying unit 120 including the functions of the first end circuit 109 and the second end circuit 110 is provided, and when the time set in the timer circuit 105 elapses on the basis of a selection signal, which is output from the control unit 107, for selecting an output voltage based on electric power supplied in accordance with a result of the negotiation and a counting result of the timer circuit 105, this selection signal supplying unit 120 may output the selection signal to the overcurrent detecting circuit 103. In addition, such a function may be realized using not logical circuits such as the end circuits but information processing using software.

The switching unit 111 is electrically connected to the overcurrent detecting circuit 103, the control unit 107, and the connector 104.

Here, the switching unit 111 may be connected between the power converting unit 102 and the connector 104. In this embodiment, the overcurrent detecting circuit 103 is disposed on a previous stage of the switching unit 111.

The switching unit 111 closes a switch provided in the switching unit 111 at a normal time. When a shutoff signal is received from the control unit 107, by opening the switch, the switching unit 111 cuts off a power supply path between the overcurrent detecting circuit 103 and the connector 104.

The display control unit 112 is electrically connected to the overcurrent detecting circuit 106 and the display unit 113.

The display control unit 112 outputs an overcurrent detection signal that indicates detection of an overcurrent using the overcurrent detecting circuit 106. As the overcurrent detection signal, for example, an OCP ERR signal can be used.

When an overcurrent detection signal is received from the overcurrent detecting circuit 106, the display control unit 112 displays a display screen indicating that an overcurrent is detected on the display unit 113. On this display screen, it may be indicated that, although a negotiation based on the USB-Type C standard normally has ended, a fault has occurred in relation with the supply of the power source thereafter.

As this display control unit 112, a microcomputer (a micro controller) can be used.

The display unit 113 is electrically connected to the display control unit 112.

The display unit 113 displays a signal output from the display control unit 112.

As the display unit 113, for example, a display device such as a liquid crystal display panel can be used. The display unit 113 displays a display screen indicating that an overcurrent has been detected on the basis of an instruction from the display control unit 112. In addition, the display unit 113 may include a drive circuit that drives the liquid crystal display panel. Furthermore, although a case in which the display unit 113 is disposed inside the power control device 1 has been described, in a case in which the power control device 1 is disposed in the display device, a display panel of the display device may be configured to be able to be used as the display unit 113. In this case, the display control unit 112 may display a display screen that indicates detection of an overcurrent on a display screen of the display device.

Although a case in which this display unit 113 displays a signal output from the display control unit 112 has been described, an output unit that outputs a signal output from the display control unit 112 to the outside may be provided. For example, the output unit may be a speaker that outputs the signal using a sound, a lamp that indicates that the signal is output, or the like.

The power control device 1 described above can be provided as one of the functions of a display device inside the display device. In addition, the power control device 1 may be connected between the display device and the external device.

Next, an operation of the power control device 1 will be described.

Figure 3:
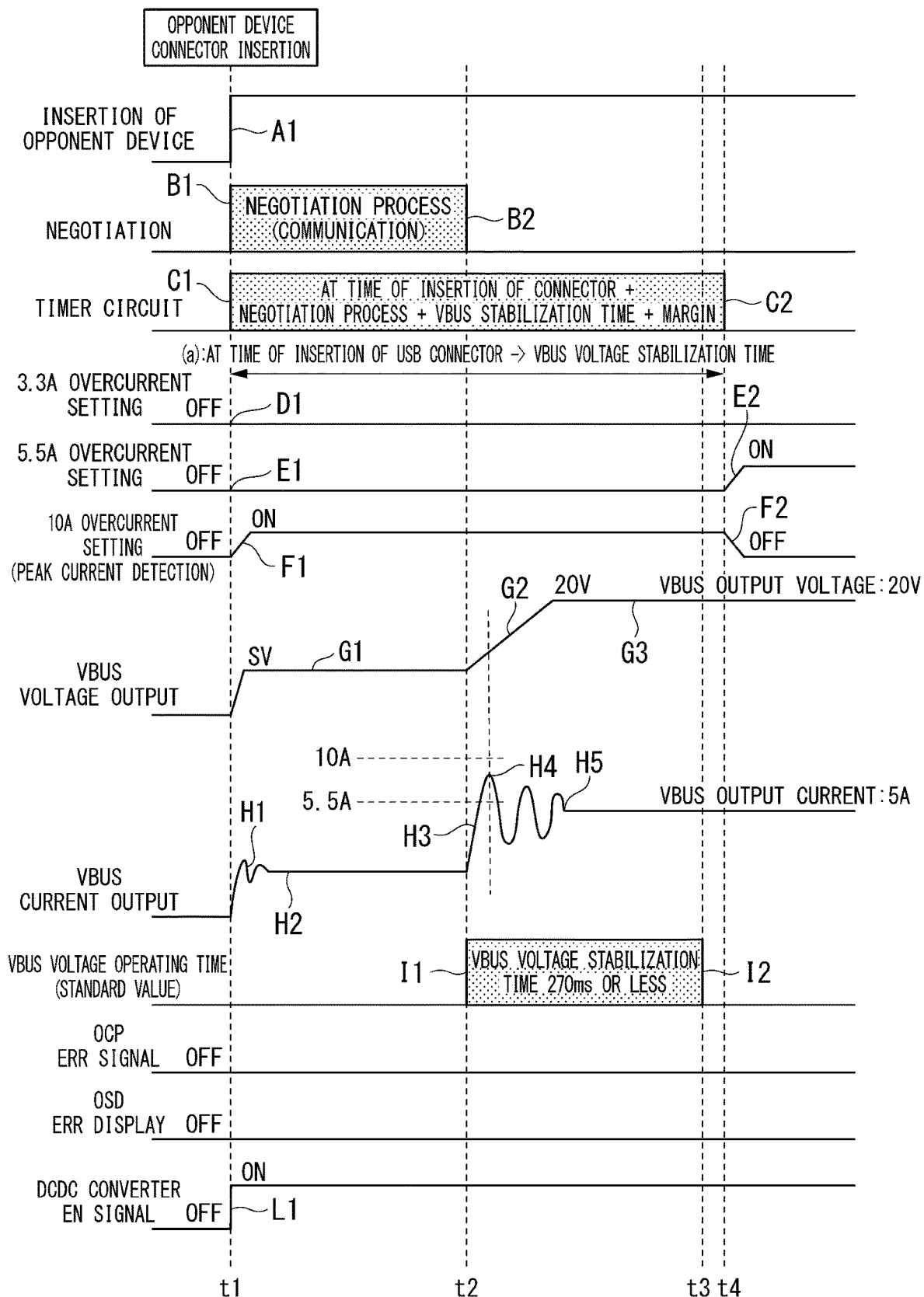
FIG. 3 is a timing diagram illustrating an operation of the power control device 1.

FIG. 3 is a timing diagram illustrating an operation of the power control device 1. This FIG. 3 illustrates an example of a case in which electric power is normally supplied to an external device, in other words, a case in which supply of electric power is not shut off by the switching unit 111. In an initial state, the switching unit 111 is in the on state.

First, when an external device is connected to the connector 104 (time t1), the control unit 107 detects that the external device is connected to the connector 104 (reference sign A1) and start a negotiation with the external device (reference sign B1). In addition, the control unit 107 outputs an instruction for causing the timer circuit 105 to start counting, outputs an instruction for outputting a VBUS voltage of 5 V to the power converting unit 102, and turns on (activates) the DCDC converter EN signal (reference sign L1).

The timer circuit 105 starts counting on the basis of an instruction from the control unit 107 (reference sign C1). In addition, when counting starts, the timer circuit 105 outputs an on signal to the overcurrent detecting circuit 106 and the inverter circuit 108. When the on signal is received from the timer circuit 105, the overcurrent detecting circuit 106 activates an overcurrent detection function (reference sign F1). Then, by turning on the overcurrent detection function, the overcurrent detecting circuit 106 monitors a current value of electric power supplied from the power converting unit 102 to the connector 104 and determines whether or not the current value exceeds the second criterion value.

Here, the inverter circuit 108 inverts the on signal and outputs the off signal to the first end circuit 109 and the second end circuit 110. One signal input to each of the first end circuit 109 and the second end circuit 110 is the off signal, and thus each of the first end circuit 109 and the second end circuit 110 outputs the off signal to the overcurrent detecting circuit 103. For this reason, since off signals are input from both the first end circuit 109 and the second end circuit 110, the overcurrent detecting circuit 103 does not detect an overcurrent. In accordance with this, the overcurrent detecting circuit 103 outputs the electric power output from the power converting unit 102 without causing the connector 104 to perform detection of an overcurrent.

When an instruction for outputting the VBUS voltage of 5 V that is a voltage at the time of performing a negotiation process is received from the control unit 107, and the DCDC converter EN signal output from the control unit 107 becomes on, the power converting unit 102 outputs the voltage of 5 V to the overcurrent detecting circuit 103 on the basis of the electric power supplied from the power supply unit 101. In accordance with this, the VBUS voltage of 5 V is supplied from the power converting unit 102 to the overcurrent detecting circuit 103 and a next stage side thereof (reference sign G1).

When the VBUS voltage is output from the power converting unit 102 to the overcurrent detecting circuit 103, a VBUS current flows from the power converting unit 102 to the overcurrent detecting circuit 103 in accordance with the output of this VBUS voltage. At this time, an inrush current flows immediately after start of the flow of the VBUS current (reference sign H1), and the current value of the VBUS current becomes stable when a certain time elapses (reference sign H2). At this time, since the VBUS voltage is 5 V, a VBUS current value when the current value becomes stable is 3 A in accordance with a relation between the output voltage and the output current illustrated in FIG. 2. An inrush current has a current value higher than this 3 A, and the peak value of the inrush current as the VBUS current, for example, becomes a current value of about 110% of 3 A (when the voltage becomes stable) and is 3.3 A as a whole. At this time, since the overcurrent detecting circuit 103 is in the off state (reference sign D1, reference sign E1), the overcurrent detection function of the overcurrent detecting circuit 103 is not operating, and the overcurrent detection function of the overcurrent detecting circuit 106 that has received the on signal from the timer circuit 105 is operating, and thus it is determined whether or not the current value exceeds the criterion current value (second criterion value) set in the overcurrent detecting circuit 106. Here, the criterion value set in the overcurrent detecting circuit 106 is the second criterion value (for example, 10 A). For this reason, the peak value of the inrush current immediately after start of flow of the VBUS current is about 3.3 A and is smaller than the second criterion value (10 A), and thus an overcurrent is not detected by the overcurrent detecting circuit 106. For this reason, the power control device 1 continues the supply of the electric power from the power converting unit 102 to the connector 104.

Next at a time t2, when the negotiation ends, the control unit 107 outputs a VBUS switching signal, which is an instruction for switching the VBUS voltage of 5 V to a voltage (for example, 20 V) corresponding to the result of the negotiation, to the power converting unit 102. This time t2 corresponds to a start time of the voltage stabilization time (reference sign I1). The power converting unit 102 switches the output voltage from 5 V to a voltage represented by the VBUS switching signal on the basis of this VBUS switching signal. Here, in a case in which the VBUS switching signal that switches the VBUS voltage, for example, into 20 V is input, the power converting unit 102 raises the voltage such that the output voltage becomes 20 V (reference sign G2).

In accordance with switching of this voltage, an inrush current flows as the VBUS current (reference sign H3). At this time, since the VBUS voltage is 20 V, the VBUS current value is 5 A from the relation between the output voltage and the output current illustrated in FIG. 2. The VBUS current value is 5 A, and thus the inrush current has a current value higher than 5 A. The peak value of the inrush current at this time, for example, may be a current value (about 5.5 A) that is about 110% of 5 A that is at the time of being stable also due to impedance of the external device connected to the connector 104. In addition, if the impedance of the connected external device is higher than that of a general external device, the peak value of the inrush current may be a current value (about 7.5 A) that is about 150% of 5 A that is at the time of being stable (reference sign H4). In such a case, the overcurrent detecting circuit 103 is in the off state (reference sign D1, reference sign E1) and is not operating, and the overcurrent detecting circuit 106 is operating, and the overcurrent detecting circuit 106 compares the current value of the inrush current with the second criterion value (10 A). The inrush current is about 7.5 A and is smaller than 10 A that is the second criterion value, and thus the overcurrent detecting circuit 106 detects an overcurrent. For this reason, the power control device 1 continues the supply of the electric power from the power converting unit 102 to the connector 104.

Thereafter, the VBUS current value converges to be the current value (5 A) that is at the normal time in accordance with elapse of time (reference sign H5). Then, the VBUS voltage also reaches 20 V within the voltage stabilization time (reference sign G3).

In addition, on the other hand, when the negotiation ends at the time t2, and a VBUS voltage switching signal is output to the power converting unit 102, the control unit 107 outputs a voltage setting signal representing this set VBUS voltage to one of the first end circuit 109 and the second end circuit 110. The control unit 107 outputs a voltage setting signal to the first end circuit 109 in a case in which the VBUS voltage is one of 5 V, 9 V, 12 V, and 15 V and outputs a voltage setting signal to the second end circuit 110 in a case in which the VBUS voltage is 20 V. In other words, the voltage setting signal is output to either the first end circuit 109 or the second end circuit 110 in accordance with an output current corresponding to the VBUS voltage. For example, in a case in which the VBUS voltage is determined as being 20 V as a result of the negotiation process, the control unit 107 outputs the voltage setting signal to the second end circuit 110.

When the voltage stabilization time elapses from the time t2 (time t3, reference sign I2), and a margin is added to the voltage stabilization time, the count value of the timer circuit 105 reaches a count value corresponding to the timer value (reference sign C2) when it reaches the time t4. When the count value reaches a count value corresponding to the timer value, the timer circuit 105 switches the on signal for the overcurrent detecting circuit 106 to the off signal (reference sign F2) and outputs the off signal to the inverter circuit 108.

In accordance with this, when the signal input from the timer circuit 105 is switched to the off signal, the overcurrent detecting circuit 106 stops the overcurrent detection function. In addition, the inverter circuit 108 inverts the input off signal into the on signal and outputs the on signal to the first end circuit 109 and the second end circuit 110.

Since the on signal is input from the inverter circuit 108, and a state in which the voltage setting signal is not input from the control unit 107 (in other words, "LOW") is formed, the first end circuit 109 outputs the "LOW" signal to the overcurrent detecting circuit 103.

Since the on signal is input from the inverter circuit 108, and a state in which the voltage setting signal is input from the control unit 107 (in other words "HI") is formed, the second end circuit 110 outputs the "HI" signal to the overcurrent detecting circuit 103.

When the "LOW" signal is input from the first end circuit 109, and the "HI" signal is input from the second end circuit 110, the overcurrent detecting circuit 103 determines that the VBUS voltage is set to 20 V and sets a criterion value used for determining an overcurrent to 5.5 A that is a current value corresponding to the output current 5 A (reference sign E2). Here, at a time point at which the criterion value is set to 5.5 A by the overcurrent detecting circuit 103, it is after elapse of the voltage stabilization time, and thus an inrush current generated in the VBUS current has already converged, and a state in which the current value is stable as being 5 A is formed. For this reason, after elapse of the voltage stabilization time, an overcurrent detection process can be performed using the criterion value set as 5.5 V.

According to the embodiment described above, at a timing at which an external device is inserted into the USB Type-C connector, a negotiation is performed using a signal connected through the USB Type-C as a trigger, a time acquired by adding a margin of several 100 msec to the VBUS voltage stabilization period (for example, 270 msec: standard value) is measured using the timer circuit, during the measurement, the overcurrent detecting circuit 106 of which a maximum current value is larger than that at the normal time is turned on, and the overcurrent detecting circuit 103 is not operated during that period. In accordance with this, only before the VBUS stabilization time is completed after an opponent device is inserted into the USB Type-C, overcurrent can be detected using an overcurrent setting value that is larger than that at the normal time. For this reason, even when an inrush current is generated at the time of switching to electric power determined through a negotiation (for example, switching from an output voltage 5 V/an output current 3 A to an output voltage 20 V/an output current 5 A), in a case in which an overcurrent due to impedance or the like of the external device connected to the connector 104 does not flow, the supply of the power source does not stop.

In addition, an erroneous operation of shutting off the supply of the electric power in accordance with detection of an inrush current generated in accordance with switching to a voltage determined through a negotiation as an overcurrent can be prevented.

In addition, on the basis of latch up of the timer circuit, the overcurrent detecting circuit 106 is turned off, and the overcurrent detecting circuit 103 is turned on, and thus after switching to the electric power determined through the negotiation, an overcurrent can be detected using the first criterion value according to the output current (for example, 3 A or 5 A) based on the electric power after the switching.

Figure 4:
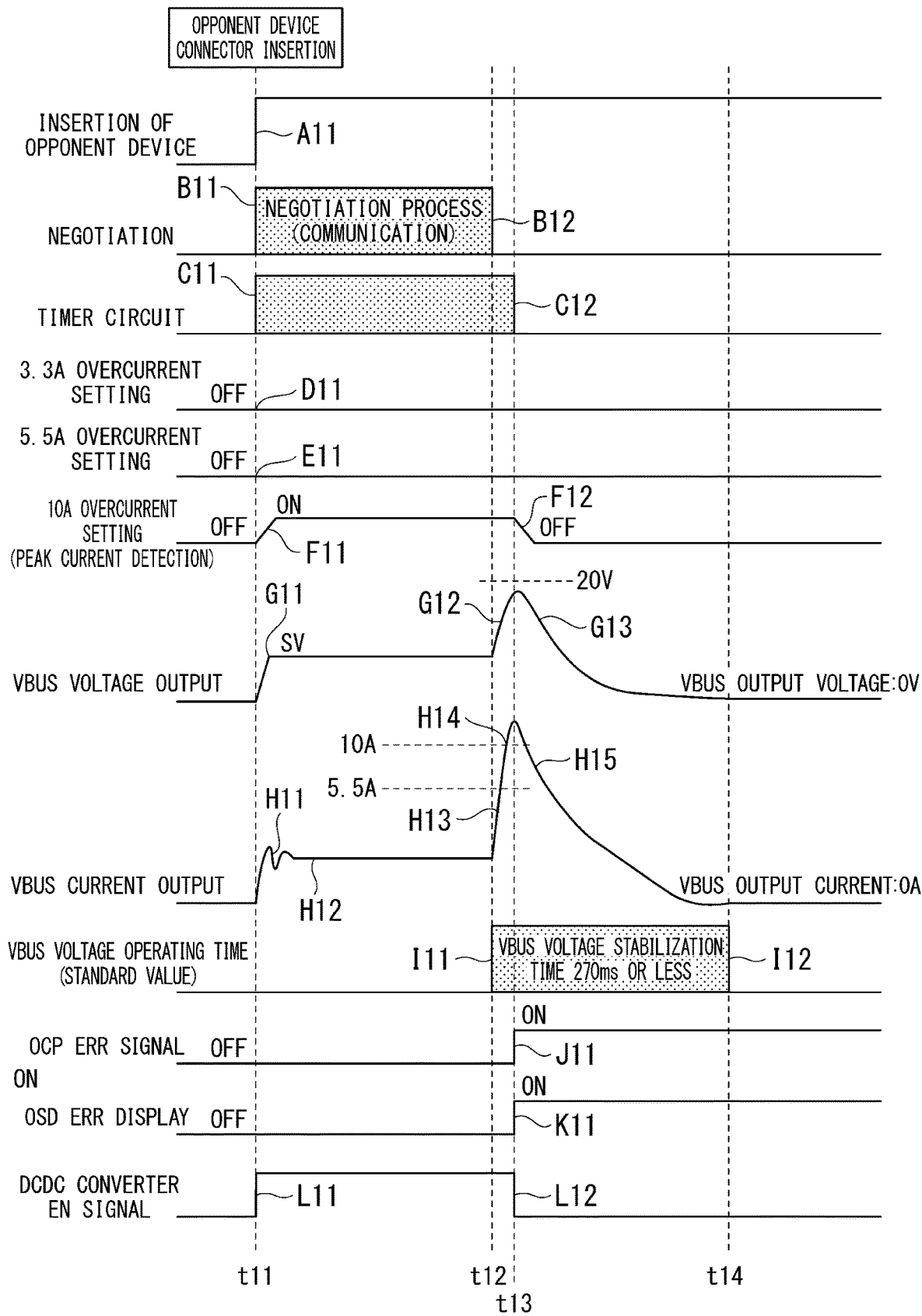
FIG. 4 is a timing diagram illustrating an operation of the power control device 1.

Next, FIG. 4 is a timing diagram illustrating an operation of the power control device 1. This FIG. 4 illustrates an example of a case in which an overcurrent is detected at the time of switching to a voltage determined through a negotiation, in other words, a case in which supply of electric power is shut off by the switching unit 111. In an initial state, the switching unit 111 is in the on state.

Reference signs A11, B11, B12, C11, D11, E11, F11, G11, H11, H12, I11, and L11 from a time t11 to a time t12 are similar to reference signs A1, B1, B2, C1, D1, E1, F1, G1, H1, and L1 at the time t1 to the time t2 illustrated in FIG. 3, and thus description thereof will be omitted, and different points will be mainly described.

Next, at the time t12, the power converting unit 102 raises the output voltage from 5 V to 20 V (reference sign G12) on the basis of the VBUS switching signal representing 20 V that is output from the control unit 107.

An inrush current flows as a VBUS current in accordance with switching of this voltage (reference sign H13). At this time, the VBUS voltage is 20 V, and thus the VBUS current value is output to be 5 A. Here, in description of FIG. 3, a case in which the VBUS current value is 5 A, and the current value is about 150% (about 7.5 A) thereof has been described. However, in a case in which the impedance of an external device is higher than a predetermined value or the like, the peak value of the inrush current may further increase. In such a case, the peak value of the inrush current at the time of switching such that the VBUS current value becomes 5 A may exceed 10 A that is set as the second criterion value of the overcurrent detecting circuit 106 (reference sign H14). Between a time t12 and a time t13, the overcurrent detecting circuit 106 compares the current value of the inrush current with the second criterion value (10 A) and, in a case in which it is determined that the inrush current exceeds 10 A that is the second criterion value, outputs an error signal (an OCP ERR signal) that is "HI" to the control unit 107 at the time t13 (reference sign J11).

When an error signal is output from the overcurrent detecting circuit 106, the control unit 107 turns off the DCDC converter EN signal (reference sign L12), outputs an instruction for stopping counting to the timer circuit 105, and outputs a shut off signal to the switching unit 111.

When the DCDC converter EN signal becomes off (reference sign L12), the power converting unit 102 stops the output of the VBUS voltage. In accordance with this, the VBUS voltage output from the power converting unit 102 decreases (reference sign G13), and the VBUS current decreases in accordance with a decrease in the VBUS voltage (reference sign H15).

When the DCDC converter EN signal becomes off, the overcurrent detecting circuit 103 stops the overcurrent detection function. In addition, when a shut off signal is output from the control unit 107 in accordance with the DCDC converter EN signal being off, the switching unit 111 opens the switch and cuts off a power supply path between the overcurrent detecting circuit 103 and the connector 104. In accordance with this, the supply of the electric power from the power converting unit 102 to the external device is shut off.

In addition, when an error signal is output from the overcurrent detecting circuit 106, the display control unit 112 turns on an error display on the display unit 113 (reference sign K11). In accordance with this, the display unit 113 displays an error screen. For example, the display unit 113 may display a character string such as "connected device being abnormal" on an on-screen display (OSD) screen as the error screen. By displaying the error screen on the display unit 113, a notification of shut-off of supply of the electric power due to flow of an overcurrent due to characteristics of an external device can be given to the user. In accordance with this, the user can recognize that shut-off of the supply of the electric power is not caused by malfunctions of the display device, the power control device 1, the port of the USB Type-C, and the USB Type-C cable, but there is a factor on the external device side.

When an instruction for stopping counting is output from the control unit 107 to the timer circuit 105, counting stops (reference sign C12), and supply of the on signal to the overcurrent detecting circuit 106 and the inverter circuit 108 stops. When the supply of the on signal stops, the overcurrent detecting circuit 106 stops the overcurrent detection function (reference sign F12).

In accordance with stop of the supply of the on signal, the inverter circuit 108 inverts the off signal that is an input signal and outputs the on signal to the first end circuit 109 and the second end circuit 110.

Here, a setting signal representing 20 V is output from the control unit 107 to the second end circuit 110. For this reason, even when the output from the inverter circuit 108 is the on signal, the setting signal representing 5 V is off, and thus the first end circuit 109 outputs the output of OFF to the overcurrent detecting circuit 103.

On the other hand, the output from the inverter circuit 108 is the on signal, and the setting signal of 20 V is the on signal, and thus the second end circuit 110 outputs the on signal.

The overcurrent detecting circuit 103 receives the on signal from the second end circuit 110, and a setting signal of 20 V is input, but the DCDC converter EN signal is off, and thus the overcurrent detection function remains in a stopped state.

At a time t14, when the end time of the voltage stabilization time comes (reference sign 112), the VBUS output voltage decreases up to 0 V until then, and the VBUS output current also decreases up to 0 A.

According to the embodiment described above, in a case in which an external device connected to the connector 104 is a device having high impedance, when switching from electric power at the time of a negotiation to electric power corresponding to the result of the negotiation, the overcurrent detecting circuit 106 detects an overcurrent, and the display unit 113 displays an abnormality indicating that an external device having a large inrush current is connected to the USB type-C connector using OSD. In this way, the shut-off of the power source being caused by connection of an external device having high impedance can be notified to the user, and the user can recognize that there is no abnormality in the display device, the power control device 1, the port of the USB Type-C, and the USB Type-C cable.

Figure 5:
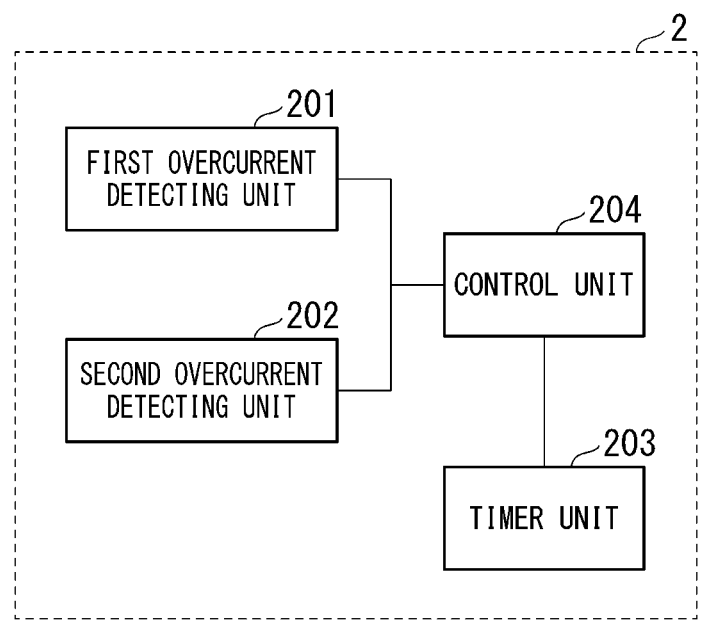
FIG. 5 is a functional block diagram illustrating the configuration of a power control device 1A according to one aspect of the present invention.

FIG. 5 is a functional block diagram illustrating the configuration of a power control device 2 according to one aspect of the present invention.

The power control device 2 includes a first overcurrent detecting unit 201, a second overcurrent detecting unit 202, a timer unit 203, and a control unit 204.

The first overcurrent detecting unit 201 detects whether or not a current supplied from a power source unit to an external device exceeds the first criterion value. The second overcurrent detecting unit 202 detects whether or not a current supplied from the power source unit to the external device exceeds a second criterion value that is a criterion value higher than the first criterion value.

In the timer unit 203, a time corresponding to a time from a time point at which switching from electric power supplied from the power source unit 205 to an external device in a period in which a negotiation is performed to electric power corresponding to a result of the negotiation with the external device is performed to a time before the supply of the electric power becomes stable is set.

The control unit 204 performs detection of an overcurrent before the negotiation ends using the second overcurrent detecting unit 202 and, when the negotiation ends, and the time set in the timer unit 203 elapses, invalidates the overcurrent detection using the second overcurrent detecting unit 202 and validates overcurrent detection using the first overcurrent detecting unit 201.

In accordance with this, in the power control device, supply of electric power can be prevented from stopping in a state in which a malfunction has not necessarily occurred.

By recording a program for realizing the function of the processing unit illustrated in FIG. 1 in a computer-readable recording medium and causing a computer system to read and execute the program recorded in this recording medium, construction management may be performed. The "computer system" described here includes an operating system (OS) and hardware such as peripherals.

In addition, in a case in which a WWW system is used, "computer system" also includes a home page providing environment (or a display environment).

Furthermore, the "computer-readable recording medium" represents a portable medium such as a flexible disk, a magneto-optical disk, a ROM, or a CD-ROM or a storage device such as a hard disk built into the computer system. In addition, the "computer-readable recording medium" includes a medium storing the program for a predetermined time such as an internal volatile memory of a computer system serving as a server or a client. The program described above may be used for realizing a part of the functions described above, and the program described above may be a program realizing the functions described above by being combined with a program recorded in the computer system in advance. In addition, the program described above is stored in a predetermined server, the program may be delivered (downloaded or the like) through a communication line in response to a request from another device.

As above, although the embodiment of the present invention has been described in detail with reference to the drawings, a specific configuration is not limited to this embodiment, and a design and the like in a range not departing from the concept of the present invention are included therein.

REFERENCE SIGNS LIST

1 Power control device
2 Power control device
20 Power converting unit
101 Power supply unit
102 Power converting unit
103 Overcurrent detecting circuit
104 Connector
105 Timer circuit
106 Overcurrent detecting circuit
107 Control unit
108 Inverter circuit
109 First end circuit
110 Second end circuit
111 Switching unit
112 Display control unit
113 Display unit
180 Inverter circuit
201 First overcurrent detecting unit
202 Second overcurrent detecting unit
203 Timer unit
204 Control unit
205 Power source unit

What is claimed is:

1. A power control device comprising:
a first overcurrent detecting unit configured to detect whether or not a current supplied from a power source unit to an external device exceeds a first criterion value;
a second overcurrent detecting unit configured to detect whether or not the current supplied from the power source unit to the external device exceeds a second criterion value that is a criterion value higher than the first criterion value;
a timer unit that is set with a time period from a first point of time at which switching from electric power supplied from the power source unit to the external device in a period, in which a negotiation is performed, to electric power corresponding to a result of the negotiation with the external device is performed into to a second point of time before the supply of the electric power becomes stable; and
a control unit configured to perform overcurrent detection using the second overcurrent detecting unit before the negotiation ends and, the control unit configured to invalidate the overcurrent detection using the second overcurrent detecting unit and to validate the overcurrent detection using the first overcurrent detecting unit when the negotiation ends, and the time that is set in the timer unit elapses.

2. The power control device according to claim 1, wherein the control unit invalidates the first overcurrent detecting unit while the negotiation is performed and until the time set in the timer unit elapses.

3. The power control device according to claim 1, wherein, in the second overcurrent detecting unit, a value corresponding to a maximum value of an inrush current flowing when switching to the electric power corresponding to the result of the negotiation is performed is set as the second criterion value.

4. The power control device according to claim 1, further comprising:
an output unit configured to output data indicating that an overcurrent has been detected by the second overcurrent detecting unit.

5. The power control device according to claim 4, further comprising:
a display unit configured to display the data output from the output unit on a display panel.

6. The power control device according to claim 1, further comprising:
a switch connected between the power source unit and a connector to which the external device is connected,
wherein, in a case in which the first overcurrent detecting unit detects that a current value has exceeded the first criterion value or in a case in which the second overcurrent detecting unit detects that a current value has exceeded the second criterion value, the control unit stops the supply of the electric power from the power source unit to the external device by turning off the switch.

7. The power control device according to claim 1, further comprising:
a selection signal supply unit configured to output a selection signal to the first overcurrent detecting unit when the time set in the timer unit elapses on the basis of the selection signal, which is output from the control unit, for selecting an output voltage based on the electric power supplied in correspondence with the result of the negotiation and a counting result of the timer unit.

8. A display device comprising a power control device, the power control device comprising:
a first overcurrent detecting unit configured to detect whether or not a current supplied from a power source unit to an external device exceeds a first criterion value;
a second overcurrent detecting unit configured to detect whether or not the current supplied from the power source unit to the external device exceeds a second criterion value that is a criterion value higher than the first criterion value;
a timer unit that is set with a time period from a first point of time at which switching from electric power supplied from the power source unit to the external device in a period, in which a negotiation is performed, to electric power corresponding to a result of the negotiation with the external device is performed into to a second point of time before the supply of the electric power becomes stable; and
a control unit configured to perform overcurrent detection using the second overcurrent detecting unit before the negotiation ends and, the control unit configured to invalidate the overcurrent detection using the second overcurrent detecting unit and to validate the overcurrent detection using the first overcurrent detecting unit when the negotiation ends, and the time that is set in the timer unit elapses.

9. A power control method comprising:
detecting whether or not a current supplied from a power source unit to an external device exceeds a first criterion value;
detecting whether or not the current supplied from the power source unit to the external device exceeds a second criterion value that is a criterion value higher than the first criterion value;

counting whether a setting time in which a time corresponding to a time from a time point at which switching from electric power supplied from the power source unit to the external device in a period, in which a negotiation is performed, to electric power corresponding to a result of the negotiation with the external device is performed to a time before the supply of the electric power becomes stable is set has elapsed; and performing overcurrent detection based on the second criterion value before the negotiation ends and, when the negotiation ends, and the setting time elapses, invalidating the overcurrent detection based on the second criterion value and validating the overcurrent detection based on the first criterion value.

* * * * *